United States Patent
Katsuno et al.

(10) Patent No.: US 9,514,127 B2
(45) Date of Patent: Dec. 6, 2016

(54) COMPUTER IMPLEMENTED METHOD, PROGRAM, AND SYSTEM FOR IDENTIFYING NON-TEXT ELEMENT SUITABLE FOR COMMUNICATION IN MULTI-LANGUAGE ENVIRONMENT

(71) Applicant: International Business Machines Corporation, Armonk, NY (US)

(72) Inventors: Yasuharu Katsuno, Tokyo (JP); Kohtaroh Miyamoto, Tokyo (JP); Ken Mizuno, Tokyo (JP); Sachiko Yoshihama, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 467 days.

(21) Appl. No.: 14/024,771

(22) Filed: Sep. 12, 2013

(65) Prior Publication Data

US 2014/0074453 A1 Mar. 13, 2014

(30) Foreign Application Priority Data

Sep. 13, 2012 (JP) .................................. 2012-201909

(51) Int. Cl.
*G06F 17/28* (2006.01)
*G06F 17/27* (2006.01)
*G06F 17/30* (2006.01)

(52) U.S. Cl.
CPC ......... *G06F 17/289* (2013.01); *G06F 17/3005* (2013.01)

(58) Field of Classification Search
CPC .. G06F 17/28; G06F 17/2809; G06F 17/2818; G06F 17/2827; G06F 17/2836; G06F 17/2854; G06F 17/2863; G06F 17/2872; G06F 17/289; G06F 17/2881; G06F 17/3025; G06F 17/30253; G06F 17/30256; G06F 17/30259
(Continued)

(56) References Cited

U.S. PATENT DOCUMENTS 5,586,197 A * 12/1996 Tsujimura ........... G06F 17/3025
382/162
5,754,872 A * 5/1998 Miyake ................ G06K 9/6807
704/3
(Continued)

FOREIGN PATENT DOCUMENTS

CN 1900933 A 1/2007
JP 06-162104 A 6/1994
(Continued)

OTHER PUBLICATIONS

Kobi Reiter, Stephen Soderland, and Oren Etzioni, Cross-Lingual Image Search on the Web, Jan. 6, 2007, International Joint Conference on Artificial Intelligence.
(Continued)

*Primary Examiner* — Lamont Spooner
(74) *Attorney, Agent, or Firm* — David M Quinn

(57) ABSTRACT

A computer implemented method, a program, and a system for effectively providing versatile non-text information suitable for use in a multi-language environment. The method includes the steps of: receiving search results of a database using a search criterion in a certain language and a search criterion in another language corresponding to the search criterion in which specific language attributes are associated with non-text elements that are included in the search results; scoring the non-text elements included in the search results depending on a similarity to another element with which a different language attribute is associated; and iden-
(Continued)

tifying at least one of the non-text elements included in the search results on the basis of the scores.

16 Claims, 12 Drawing Sheets

(58) Field of Classification Search
USPC .................... 704/1, 2–8, 9; 707/706–708
See application file for complete search history.

(56) References Cited

U.S. PATENT DOCUMENTS

| | | | |
|---|---|---|---|
| 7,711,682 B2 | 5/2010 | Zhang | |
| 8,326,029 B1* | 12/2012 | Obrador | G06F 17/3025 382/164 |
| 8,538,957 B1* | 9/2013 | Zhou | G06F 17/2854 707/728 |
| 8,577,910 B1* | 11/2013 | Hodge | G06F 17/30 706/11 |
| 8,949,107 B1* | 2/2015 | Bhagat | G06F 17/30864 379/88.14 |
| 9,043,316 B1* | 5/2015 | Murphy-Chutorian | G06K 9/46 707/723 |
| 2003/0041047 A1* | 2/2003 | Chang | G06F 17/30017 |
| 2003/0208473 A1* | 11/2003 | Lennon | G06F 17/30017 |
| 2007/0103482 A1* | 5/2007 | Yoshiura | G06F 17/153 345/589 |
| 2008/0152231 A1* | 6/2008 | Gokturk | G06F 17/30256 382/209 |
| 2009/0024579 A1* | 1/2009 | Obrador | G06F 17/30277 |
| 2009/0024580 A1* | 1/2009 | Obrador | G06F 17/30256 |
| 2009/0119308 A1* | 5/2009 | Clark | G06F 17/28 |
| 2009/0132233 A1* | 5/2009 | Etzioni | G06F 17/28 704/3 |
| 2010/0310172 A1* | 12/2010 | Natarajan | G06K 9/00865 382/187 |
| 2011/0106805 A1* | 5/2011 | Bao | G06F 17/30017 707/737 |
| 2011/0119298 A1* | 5/2011 | Arrasvuori | G06F 17/30867 707/769 |
| 2011/0123115 A1* | 5/2011 | Lee | G06K 9/036 382/185 |
| 2011/0218984 A1* | 9/2011 | Gaash | G06F 17/30241 707/706 |
| 2012/0134590 A1* | 5/2012 | Petrou | G06F 17/30253 382/182 |
| 2012/0233196 A1* | 9/2012 | Wu | G06F 17/30669 707/760 |
| 2012/0265761 A1* | 10/2012 | Atsmon | G06F 17/3028 707/740 |
| 2012/0290967 A1* | 11/2012 | Scott | G06F 17/30967 715/780 |
| 2013/0204874 A1* | 8/2013 | Frey | G06F 17/30011 707/737 |

FOREIGN PATENT DOCUMENTS

| | | |
|---|---|---|
| JP | 06162104 A | 10/1994 |
| JP | 2601111 B | 4/1997 |
| JP | 10-289251 A | 10/1998 |
| JP | 2000-285141 A | 10/2000 |
| JP | 2000285141 A | 10/2000 |
| JP | 2007-299172 A | 11/2007 |
| JP | 2007229172 A | 11/2007 |
| JP | 2008-547061 A | 12/2008 |
| JP | 4340367 B | 10/2009 |
| JP | 4340367 B | 10/2009 |
| JP | 4796435 B | 10/2011 |
| JP | 4796435 B | 10/2011 |
| JP | 14024771 B | 9/2013 |

OTHER PUBLICATIONS

Kobi Reiter, Cross-Lingual Image Search on the Web, Jan. 6, 2007, pp. 1-8, International Joint Conference on Artificial Intelligence, Turing Center—University of Washington, Seattle, WA, USA. <http://www.homes.cs.washington.edu/~soderian/Reiter_CLIA07.pdf/>.

Google Inc., Googie Image Search, Web Search Help, Date Accessed: Jan. 1, 2007, Goode Inc., Published online: <https://support.google.com/websearch/answer/112511?hl=ja&rd=1/>.

So-Zou.JP, Polygot Image Search, Date Accessed: Jan. 6, 2007, BABA, Published online: <http://www.crystal-creation.com/software/polyglot-image-search/>.

* cited by examiner

FIG. 9

| TRANSLATION RESULT (SEARCH CONDITION) | | FIRST CANDIDATE | | SECOND CANDIDATE | | THIRD CANDIDATE | | FOURTH CANDIDATE | | FIFTH CANDIDATE | |
|---|---|---|---|---|---|---|---|---|---|---|---|
| LANGUAGE = ENGLISH KEYWORD = EARTHQUAKE | SMOOTHNESS | | 0.86 | | 0.94 | | 0.58 | | 0.82 | | 0.84 |
| | OCR | | 1.00 | | 1.00 | | 1.00 | | 1.00 | | 1.00 |
| | CONTOUR | | 0.60 | | 0.78 | | 0.82 | | 0.88 | | 0.74 |
| | COLOR | | 0.76 | | 0.50 | | 0.62 | | 0.76 | | 0.52 |
| | TOTAL | | 0.82 | | 0.84 | | 0.78 | | 0.88 | | 0.82 |
| LANGUAGE = JAPANESE KEYWORD = JISHIN | SMOOTHNESS | | 0.94 | | 0.84 | | 0.84 | | 0.88 | | 0.34 |
| | OCR | | 0.36 | | 1.00 | | 1.00 | | 1.00 | | 0.50 |
| | CONTOUR | | 0.06 | | 0.04 | | 0.70 | | 0.68 | | 0.82 |
| | COLOR | | 0.62 | | 0.66 | | 0.84 | | 0.70 | | 0.26 |
| | TOTAL | | 0.48 | | 0.64 | | 0.84 | | 0.84 | | 0.52 |
| LANGUAGE = CHINESE KEYWORD = DIZHEN | SMOOTHNESS | | 0.24 | | 0.22 | | 0.44 | | 0.74 | | 0.46 |
| | OCR | | 0.06 | | 1.00 | | 1.00 | | 0.84 | | 0.54 |
| | CONTOUR | | 0.50 | | 0.18 | | 0.48 | | 0.46 | | 0.64 |
| | COLOR | | 0.24 | | 0.66 | | 0.06 | | 0.18 | | 0.42 |
| | TOTAL | | 0.54 | | 0.42 | | 0.56 | | 0.60 | | 0.78 |
| LANGUAGE = SPANISH KEYWORD = TERREMOTO | SMOOTHNESS | | 0.54 | | 0.42 | | 0.18 | | 0.10 | | 0.78 |
| | OCR | | 1.00 | | 1.00 | | 1.00 | | 1.00 | | 0.82 |
| | CONTOUR | | 0.82 | | 0.06 | | 0.02 | | 0.02 | | 0.06 |
| | COLOR | | 0.62 | | 0.14 | | 0.02 | | 0.04 | | 0.68 |
| | TOTAL | | 0.76 | | 0.44 | | 0.34 | | 0.32 | | 0.58 |

FIG. 10

| TRANSLATION RESULT (SEARCH CONDITION) | | FIRST CANDIDATE | | SECOND CANDIDATE | | THIRD CANDIDATE | | FOURTH CANDIDATE | | FIFTH CANDIDATE | |
|---|---|---|---|---|---|---|---|---|---|---|---|
| LANGUAGE = ENGLISH KEYWORD = TSUNAMI | SMOOTHNESS | 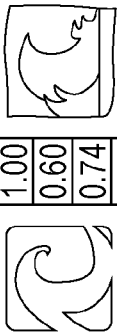 | 0.92 | 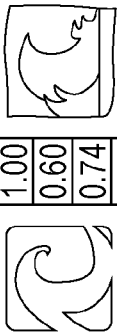 | 0.92 | 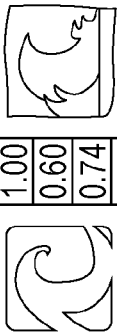 | 0.84 | 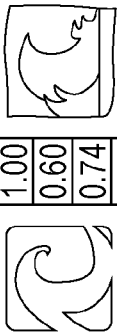 | 0.94 | 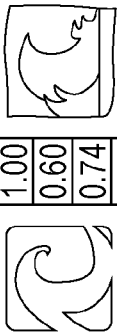 | 0.94 |
| | OCR | | 1.00 | | 1.00 | | 1.00 | | 1.00 | | 0.06 |
| | CONTOUR | | 0.60 | | 0.72 | | 0.64 | | 0.92 | | 0.78 |
| | COLOR | | 0.74 | | 0.42 | | 0.72 | | 0.96 | | 0.62 |
| | TOTAL | | 0.82 | | 0.82 | | 0.80 | | 0.96 | | 0.60 |
| LANGUAGE = JAPANESE KEYWORD = TSUNAMI | SMOOTHNESS | 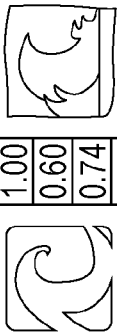 | 0.84 | 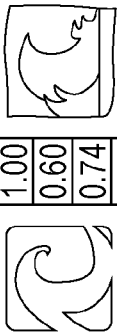 | 0.40 | 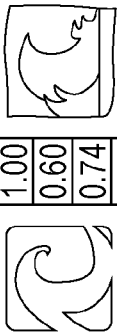 | 0.64 | 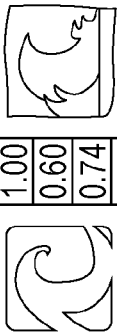 | 0.14 | 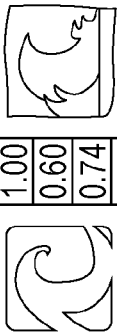 | 0.82 |
| | OCR | | 0.36 | | 1.00 | | 0.26 | | 0.42 | | 0.26 |
| | CONTOUR | | 0.64 | | 0.26 | | 0.52 | | 0.22 | | 0.68 |
| | COLOR | | 0.66 | | 0.58 | | 0.78 | | 0.34 | | 0.62 |
| | TOTAL | | 0.62 | | 0.44 | | 0.52 | | 0.12 | | 0.82 |
| LANGUAGE = CHINESE KEYWORD = HAIXIAO | SMOOTHNESS | 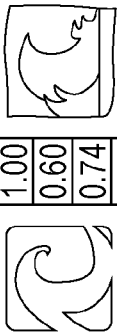 | 0.94 | 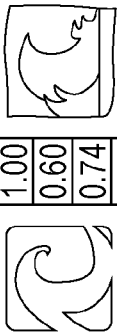 | 0.44 | 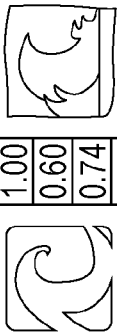 | 0.54 | 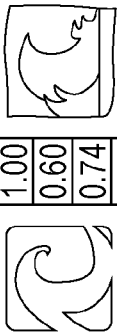 | 0.08 | 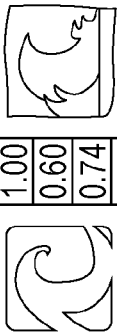 | 0.92 |
| | OCR | | 1.00 | | 0.26 | | 0.22 | | 0.26 | | 1.00 |
| | CONTOUR | | 0.92 | | 0.02 | | 0.10 | | 0.02 | | 0.20 |
| | COLOR | | 0.96 | | 0.24 | | 0.22 | | 0.14 | | 0.98 |
| | TOTAL | | 0.96 | | 0.24 | | 0.28 | | 0.14 | | 0.76 |
| LANGUAGE = SPANISH KEYWORD = TSUNAMI | SMOOTHNESS | 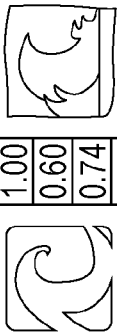 | 0.62 | 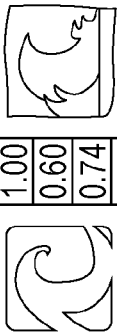 | 0.84 | 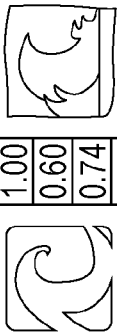 | 0.86 | 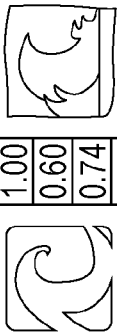 | 0.78 | 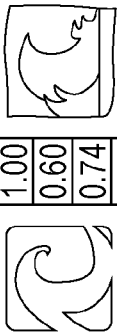 | 0.88 |
| | OCR | | 1.00 | | 1.00 | | 1.00 | | 0.06 | | 0.82 |
| | CONTOUR | | 0.06 | | 0.60 | | 0.68 | | 0.72 | | 0.68 |
| | COLOR | | 0.74 | | 0.78 | | 0.12 | | 0.08 | | 0.56 |
| | TOTAL | | 0.58 | | 0.80 | | 0.74 | | 0.46 | | 0.76 |

FIG. 11

| TRANSLATION RESULT (SEARCH CONDITION) | | FIRST CANDIDATE | | SECOND CANDIDATE | | THIRD CANDIDATE | | FOURTH CANDIDATE | | FIFTH CANDIDATE | |
|---|---|---|---|---|---|---|---|---|---|---|---|
| LANGUAGE = ENGLISH KEYWORD = EXIT | SMOOTHNESS | | 0.86 | | 0.82 | | 0.66 | | 0.84 | | 0.52 |
| | OCR | | 1.00 | | 1.00 | | 0.24 | | 0.84 | | 0.60 |
| | CONTOUR | | 0.34 | | 0.30 | | 0.94 | | 0.24 | | 0.20 |
| | COLOR | | 0.46 | | 0.40 | | 0.88 | | 0.68 | | 0.24 |
| | TOTAL | | 0.70 | | 0.66 | | 0.66 | | 0.64 | | 0.40 |
| LANGUAGE = JAPANESE KEYWORD = DEGUCHI | SMOOTHNESS | | 0.68 | | 0.58 | | 0.70 | | 0.22 | | 0.90 |
| | OCR | | 1.00 | | 0.46 | | 0.88 | | 0.32 | | 1.00 |
| | CONTOUR | | 0.74 | | 0.64 | | 0.76 | | 0.16 | | 0.98 |
| | COLOR | | 0.46 | | 0.74 | | 0.58 | | 0.16 | | 0.94 |
| | TOTAL | | 0.76 | | 0.58 | | 0.76 | | 0.22 | | 0.96 |
| LANGUAGE = CHINESE KEYWORD = CHUKOU | SMOOTHNESS | | 0.94 | | 0.50 | | 0.90 | | 0.86 | | 0.46 |
| | OCR | | 1.00 | | 0.26 | | 0.84 | | 0.12 | | 0.34 |
| | CONTOUR | | 0.92 | | 0.02 | | 0.62 | | 0.08 | | 0.02 |
| | COLOR | | 0.44 | | 0.38 | | 0.26 | | 0.94 | | 0.66 |
| | TOTAL | | 0.88 | | 0.28 | | 0.74 | | 0.44 | | 0.32 |
| LANGUAGE = SPANISH KEYWORD = SALIDA | SMOOTHNESS | | 0.64 | | 0.98 | | 0.52 | | 0.94 | | 0.68 |
| | OCR | | 0.02 | | 1.00 | | 0.58 | | 0.10 | | 0.90 |
| | CONTOUR | | 0.42 | | 0.52 | | 0.00 | | 0.88 | | 0.70 |
| | COLOR | | 0.74 | | 0.70 | | 0.12 | | 0.60 | | 0.52 |
| | TOTAL | | 0.42 | | 0.76 | | 0.34 | | 0.64 | | 0.72 |

COMPUTER IMPLEMENTED METHOD, PROGRAM, AND SYSTEM FOR IDENTIFYING NON-TEXT ELEMENT SUITABLE FOR COMMUNICATION IN MULTI-LANGUAGE ENVIRONMENT

CROSS-REFERENCE

This application claims priority under 35 U.S.C. §119 from Japanese Patent Application No. 2012-201909 filed on Sep. 13, 2012 the entire contents of which are incorporated herein by reference.

TECHNICAL FIELD

The present invention generally relates to an information processing technique, and more specifically, it relates to a computer implemented method, program, and system for identifying a non-text element suitable for communication in a multilanguage environment.

BACKGROUND

In recent years, a search technique for non-text information, such as image and sound, has been developed and is becoming widespread. For example, users can search for related images present on the Internet by inputting one or more search keywords to execute an image search.

There may be cases where it is intuitive, flexible, and convenient to use non-text information (image, sound, etc.) in communication. However, since the non-text information can be interpreted differently depending on the person, miscommunication tends to occur. For example, since image icons have different meanings among communities having different cultures, there is a possibility that miscommunication may occur among people who belong to different communities.

SUMMARY

One of the objectives of the present invention is to provide a computer implemented method, program, and system for identifying a non-text element suitable for communication in a multilanguage environment.

To achieve the above objective, a computer implemented method, a program, and a system for identifying a non-text element suitable for communication in a multilanguage environment are provided. The method includes the step of receiving search results of the database using a search criterion in a certain language and a search criterion in another language corresponding to the first search criterion. Specific language attributes are associated with non-text elements included in the search results. The method further includes the steps of scoring the non-text elements included in the search results based on their similarity to another element with which a different language attribute is associated and identifying at least one of the non-text elements included in the search results based on the scores.

Preferably, in the scoring step, a non-text element having a high similarity to another element with which a different language attribute is associated is given a high score. The method may further include the step of translating the search criterion in a certain language by using a translation engine to generate a search criterion in another language.

Preferably, the non-text elements are images and/or sound. The images searched for in the present invention include a still image, a moving image, and any other forms of image.

Preferably, the method further includes the steps of searching the database by using the search criterion in the certain language and the search criterion in the other language corresponding to the search criterion and associating the language used for the search, as a language attribute, with the non-text elements included in the search results.

Preferably, the scoring step includes the step of calculating scores for shapes included in the image elements by comparing a plurality of non-text elements. The step of giving shapes scores may include: extracting contour information of the image elements and comparing the contour information extracted from the plurality of image elements, wherein, preferably, contour information that is larger, smaller, and/or different in orientation is compared. The step of comparing the contour information may include referring to a shape-pattern classification dictionary prepared in advance so that a plurality of non-text elements can be compared in consideration of a related shape-pattern classification.

Preferably, the scoring step includes the step of calculating color-component scores for information about color components included in the image elements by comparing the plurality of non-text elements. Calculating the color-component scores may include comparing the representative color component values of the entire image for the plurality of image elements. Preferably, the representative value of the color components is the mean, median, mode and/or a significant value of the color component values of the image element in question.

Preferably, the method further includes the step of calculating smoothness scores based on the smoothness of the image elements. Calculating the smoothness scores includes dividing each of the image elements into a plurality of regions in accordance with predetermined rules, calculating the proportion of the same color for each of the plurality of regions, and calculating the smoothness scores based on the proportion of the same color of each of the plurality of regions. The method further includes the step of attempting character recognition of a character included in the image element by using an optical character recognition technique and the step of calculating character recognition scores based on the result of character recognition.

Preferably, the step of scoring the non-text elements includes the step of calculating a total score based on at least one of the shape score, the color-component score, the smoothness score, and the character recognition score of each of the non-text elements. The method further includes t the step of identifying at least one of the non-text elements included in the search results based on the total score.

Although the outline of the present invention has been described above as a computer implemented method for identifying a non-text element suitable for communication in a multilanguage environment, the present invention can also be a program, a program product, software, a software product, and a system or unit.

Examples of the program product and the software product can include storage media that store the above-described program and software and media that transmit the program and software. The program can cause a computer to execute the steps of the above-described method.

The outline of the present invention is not all the necessary features of the present invention; it should be noted that the present invention can also include a combination or subcombination of the components.

BRIEF DESCRIPTION OF THE DRAWINGS

FIG. 9 is a diagram for explaining an example of search results of the image search system in the embodiment of the present invention.

FIG. 10 is a diagram for explaining an example of search results of the image search system in the embodiment of the present invention.

FIG. 11 is a diagram for explaining an example of search results of the image search system in the embodiment of the present invention.

DETAILED DESCRIPTION

Figure 1:
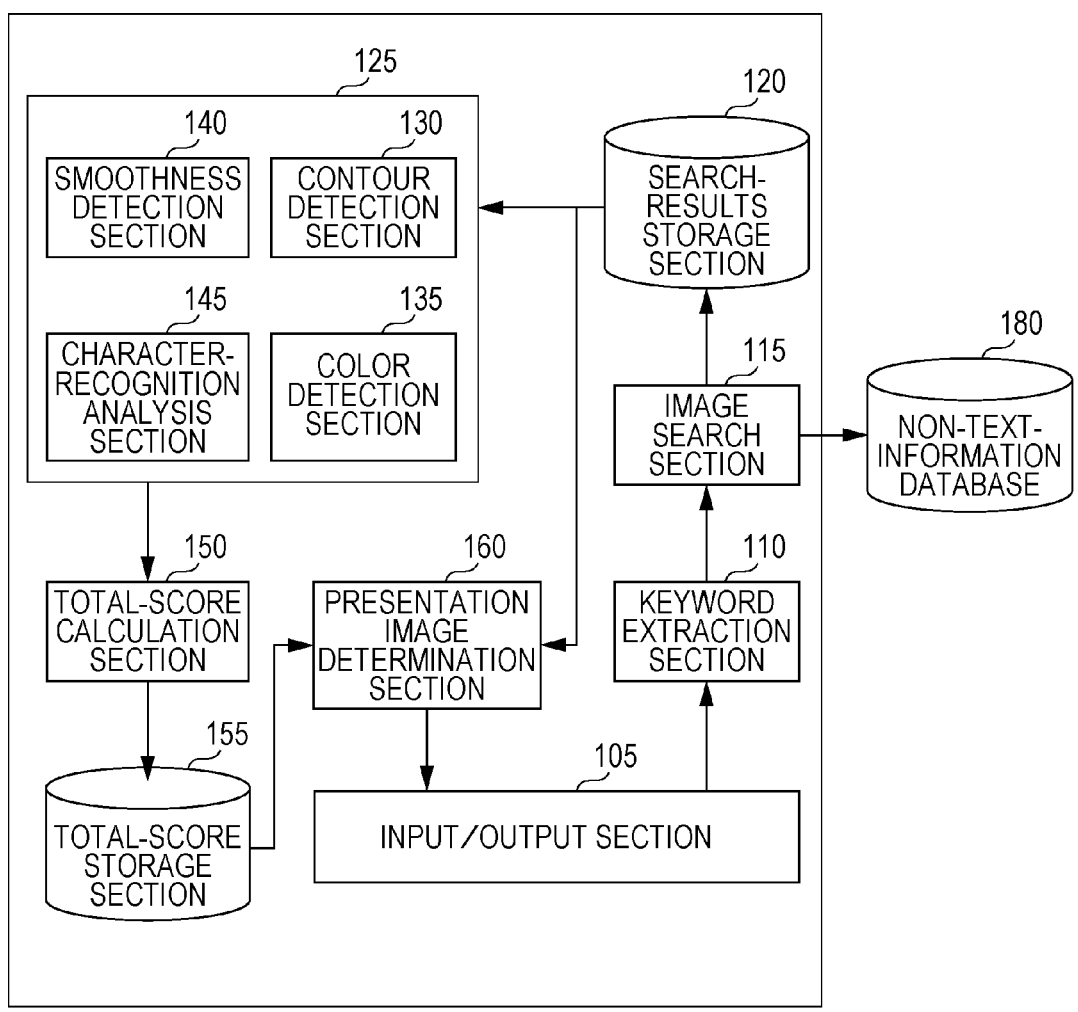
FIG. 1 is a functional block diagram of an image search system of an embodiment of the present invention.

Although an embodiment of the present invention will be described in detail below based on the drawings, it is to be understood that the embodiment does not limit the invention described in the scope of claims and that all of combinations of features described in the embodiment are not essential for the solutions of the invention.

The present invention can be achieved in many different forms and should not be limited only to the description of the embodiment. The same elements are given the same reference numerals throughout the description of the embodiment.

In an embodiment of the present invention, a user is presented with image icons that match search criteria that are input by the user and processed in an image search system. In particular, in an embodiment of the present invention, versatile image icons suitable for use in communication among people who belong to communities having different cultures and languages are presented to the user.

In an embodiment of the present invention, a query including a search criterion (keyword) based on user input is translated into a plurality of languages by a translation engine. Then, an image search is executed based on the original keyword and the translated keyword. In the embodiment of the present invention, images included in the results of the image search are each given a specific language attribute.

Next, in the embodiment of the present invention, the images included in the image search results are subjected to a character recognition analysis, color detection, contour detection, and smoothness detection. In the contour detection and the color detection, feature values are extracted for the contours and the color components of the individual images. Next, the degree of presence of similar images across the languages in terms of contour and/or color components is analyzed using the extracted feature values. In the case where there is a high degree of presence of similar images of a certain image, to which other language attributes are given, the certain image is given a high score.

Furthermore, in the embodiment of the present invention, the character recognition analysis and the smoothness detection are performed to determine whether the individual images are suitable as communication means. Specifically, if a character is included, language dependency increases. Therefore, an image that has a high degree of inclusion of characters is given a high score as a result of character recognition analysis. Furthermore, to exclude images having too much information and not suitable as a communication means, such as pictures, images having low smoothness are given a high score as a result of smoothness detection.

In the embodiment of the present invention, the total scores of the individual images can be obtained based on the scores obtained by the character recognition analysis, the color detection, the contour detection, and the smoothness detection, by normalizing the four scores and calculating the average value thereof. Then, an image icon suitable as communication means that least depends on a language in a multilanguage environment is identified in accordance with the total scores and is presented to the user.

A conceivable use case of the image search system of the embodiment of the present invention is that an image icon suitable for communication in a multilanguage environment, which is obtained by accessing the image search system via mobile terminals, such as smart phones, is displayed on the mobile terminals and shared by people who cannot understand mutual languages so that communication among them is enabled.

Another conceivable use case is that, when distributing a message or news to many people, an image icon that indicates the message or news, obtained by the image search system, is distributed. Many target people cannot read characters. For such people, image icons presented by the image search system, suitable for communication in a multilanguage environment, can be effective information sources.

Yet another use case is when a literary work designed to be used locally, such as an existing brochure, is distributed globally, the image search system of the embodiment of the present invention can be used to verify whether an image icon included in the literary work can be understood globally, and if it cannot be understood, to obtain a possible substitute.

The embodiment of the present invention will be described in more detail hereinbelow with reference to FIGS. 1 to 12.

FIG. 1 is a functional block diagram of an image search system 100 of the embodiment of the present invention. The components shown in the functional block diagram in FIG. 1 can be implemented by loading an operating system and a computer program, such as an application program, stored in a hard disk drive 13 or the like, in a main memory 4 and causing a CPU 1 to read them and hardware resources and software to cooperate with each other.

The image search system 100 of the embodiment of the present invention includes an input/output section 105, a keyword extraction section 110, an image search section 115, a search-results storage section 120, a search-results analysis section 125, a total-score calculation section 150, a total-score storage section 155, and a presentation-image determination section 160.

The input/output section 105 provides an input and output interface between the image search system 100 and a user or another computer system. In the embodiment of the present invention, for example, the user inputs image search criteria via the input/output section 105.

The keyword extraction section 110 of the embodiment of the present invention reads the search criteria input via the input/output section 105 to extract one or more search keywords and passes the keywords to the image search section 115. In the embodiment of the present invention, the search criteria include the description of communication and a language attribute. For example, if a natural sentence "an earthquake warning has been issued. Be alert." and a language attribute Japanese are input as search criteria, the keyword extraction section 110 provides, for example, a function of extracting search keywords "earthquake", "warning", and "alert".

The keyword extraction section 110 of the embodiment of the present invention implements keyword extraction by using the well-known tf-idf method. The term tf is an abbreviation for term frequency, and idf is an abbreviation for inverse document frequency. For example, specifically, for individual words i obtained from a document j by a morphological analysis, if a value obtained by multiplying $tf_{i,j}$ and $idf_i$, which are obtained by the following expressions, is a predetermined threshold value or more, the word i may be extracted as a search keyword.

$$tf_{i,j} = \frac{n_{i,j}}{\sum_k n_{k,j}}$$ [Expression 1]

$$idf_i = \log \frac{|D|}{|\{d : d \ni t_i\}|}$$

where $n_{i,j}$ is the frequency of appearance of the word i in the document j, $|D|$ is the number of documents, and $|\{d:d \ni t_i\}|$ is the number of documents including the word i.

Furthermore, the keyword extraction section 110 of the embodiment of the present invention translates the extracted search criteria or search keywords to one or more predetermined languages to obtain corresponding search keywords and passes the keywords and the language attributes thereof to the image search section 115. The predetermined languages may be predetermined main languages, may be designated by the user each time, or may be a combination thereof. Preferably, the predetermined languages include the language of the other end of the communication.

The image search section 115 of the embodiment of the present invention makes an inquiry to a non-text-information database 180 by using a query including the search keywords extracted by the keyword extraction section 110 and their language attributes to obtain a plurality of images that match the keywords. It is preferable to generate queries for the individual language attributes and to make inquiries to the non-text-information database 180. Images obtained as search results of the image search section 115 are each given one or more language attributes. The language attributes given to the images of the search results may be the language attributes given to the search keywords that are used when the image search section 115 performed the search.

Figure 8:
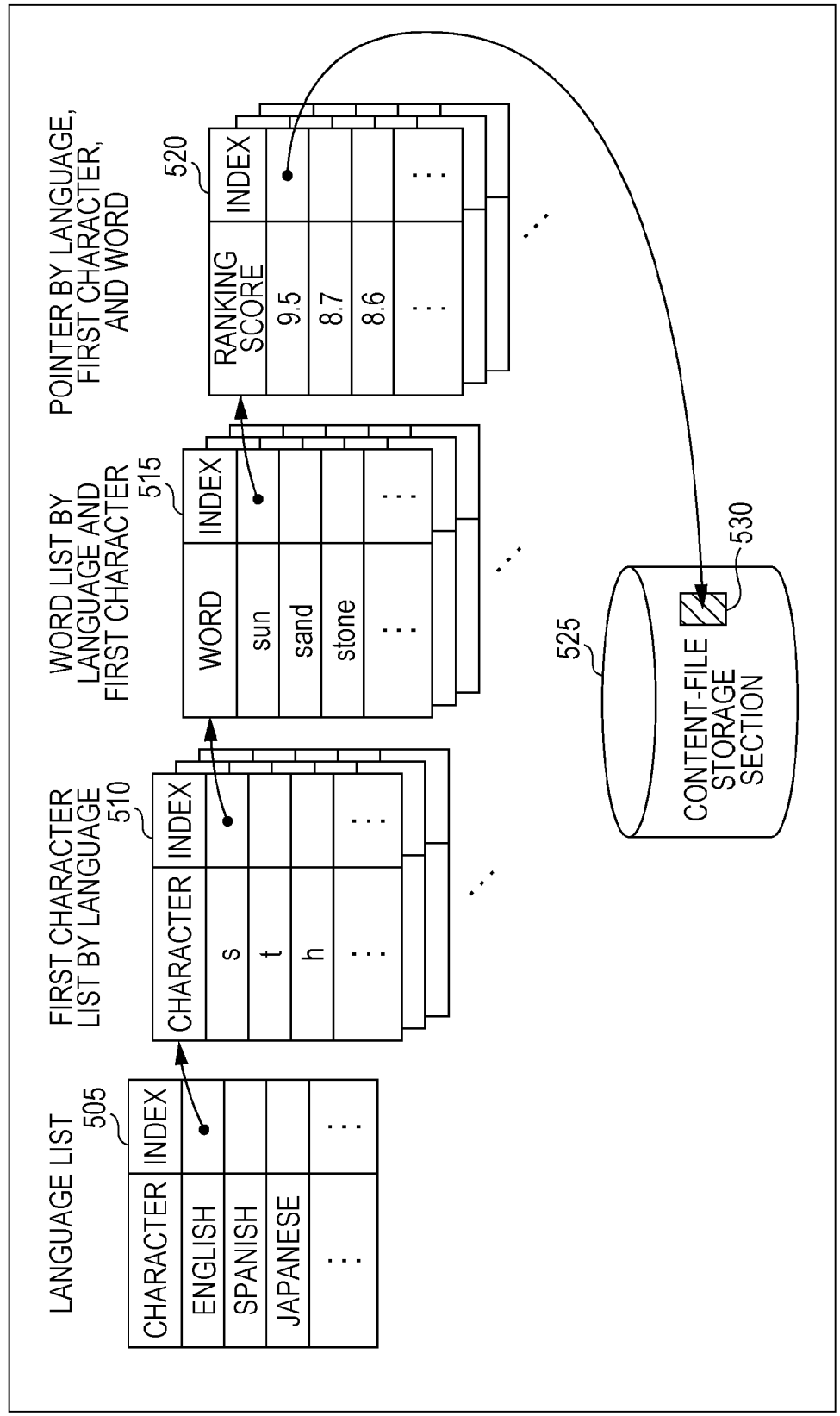
FIG. 8 is an image diagram for explaining a non-text-information database in the embodiment of the present invention.

Referring to FIG. 8, an example of the non-text-information database 180 of the present application will be described in more detail. FIG. 8 is an image diagram for explaining the non-text-information database 180 of the embodiment of the present invention. The non-text-information database 180 includes a language list 505, a first character list 510 by language, a word list 515 by language and first character, a pointer 520 by language, first character, and word, and a content-file storage section 525.

Data to be stored in the non-text-information database 180 of the present application can be obtained by crawling on a web server (not shown) on the Internet. Specifically, the non-text-information database 180 of the embodiment of the present invention obtains information on an image on the Internet, such as the file name of the image, an alt attribute, such as a substitute file associated with the image, and text in the vicinity of the image, from a crawling engine (not shown) to generate meta information (index keywords). At that time, one or more language attributes of the image are obtained by finding a language attribute assigned to the image or a web page including the image, the file name, the encoding system, or the like.

The non-text-information database 180 of the present application forms indices for the images to be stored from the meta information and the language attributes. Specifically, language attributes are stored in the language list 505, the first characters of index keywords are stored in the first character list 510 by language, and index keywords are stored in the word list 515 by language and first character, and pointers for content files 530 stored in the content-file storage section 525 are stored in the pointer 520 by language, first character, and word. The individual tables 505 to 520 are indicated by the pointers.

The pointer 520 by language, first character, and word includes a ranking score that indicates the popularity of the image in a plurality of images having the same keyword index. Although the ranking score can by obtained by measuring the number of times that the image is clicked in the image search result, a method therefor can be designed by those skilled in the art, and thus, it is not described here in detail.

When an inquiry is given to the non-text-information database 180 of the embodiment of the present invention by using a query including a search keyword and its language attribute, first, matching between the language attribute in the query and the language list 505 is performed, in which matching between the first character list 510 by language corresponding to the target language attribute and the first character of the search keyword included in the query is performed. Next, matching between the word list 515 by language and first character corresponding to the matched first character and the search keyword in the query is performed, in which the matched pointer 520 by language, first character, and word is identified. A predetermined number of content files 530 having high ranking scores stored in the content-file storage section 525 are returned as responses to the query by using the identified pointer 520 by language, first character, and word.

The content files 530 themselves can be stored in the content-file storage section 525, or alternatively, uniform resource locators (URLs) that indicate the locations of contents on the Internet may be stored in the content-file storage section 525 and may be returned to. In the latter case, the image search section 115 obtains the image in question from the web server on the Internet by using the returned URL.

In the embodiment of the present invention, the language list 505, the first character list 510 by language, and the word list 515 by language and first character can be configured such that frequently used columns are dynamically moved to higher levels to increase the search speed.

The search-results storage section 120 of the embodiment of the present invention stores the search results including the plurality of images that the image search section 115 has obtained. In the search-results storage section 120, the individual images of the search results are associated with one or more language attributes.

The search-results analysis section 125 of the embodiment of the present invention analyzes the search results including the plurality of images that are found by the image search section 115 and stored in the search-results storage section 120. The search-results analysis section 125 includes a contour detection section 130, a color detection section 135, a smoothness detection section 140, and a character-recognition analysis section 145.

The contour detection section 130 of the embodiment of the present invention extracts feature points of objects included in the individual images to obtain contour information and analyzes the similarity of the contour information among the images. As a result, if target images often have high similarity of contour information to another image given a different language attribute, the images are given a higher "contour score".

The color detection section 135 of the embodiment of the present invention analyzes the similarity of color components among the images after extracting the color components of the individual images. As a result, an image that often has high similarity between it and an image having color components given a different language attribute is given a high "color-component score". Such scoring is performed to exclude a highly culture specific image in view of color components when expressing a certain event. For example, although the color of mailboxes in America is blue, it is red in Japan, England, etc., green in the People's Republic of China, and yellow in Germany, France, etc. Accordingly, when an image icon of a mailbox is searched for, an image that cannot be recognized as a mailbox without color has a low possibility that it is recognized in a multi-language environment, and thus, it is necessary to rate such an image low.

The smoothness detection section 140 of the embodiment of the present invention obtains smoothness scores for the individual images based on the proportion of subregions of a uniform color. The smoothness detection section 140 gives an image having low smoothness a high "smoothness score". This is because many images with high smoothness are landscape pictures or the like, which are not intuitive and clear due to too large amount of information and thus are often unsuitable for communication.

The character-recognition analysis section 145 of the embodiment of the present invention analyzes the degree of inclusion of characters that depend on languages in the individual images of the search results and gives images with a low degree a high "character recognition score". This is because an image including many language-dependent characters is useless as communication means for persons who cannot understand the language. The character-recognition analysis section 145 can be implemented by applying an existing optical character recognition technique (simply referred to as "OCR").

Calculations of "contour score", "color-component score", "smoothness score", and "character recognition score" will be described later in detail.

The total-score calculation section 150 of the embodiment of the present invention receives "element scores", that is, a "smoothness score", a "character recognition score", a "color-component score", and a "contour score", from the search-results analysis section 125, and gives a "total score" to each of the images on the basis thereof. The total scores calculated by the total-score calculation section 150 of the embodiment of the present invention are stored in the total-score storage section 155. For example, in the embodiment of the present invention, the "total score" is obtained by normalizing the "smoothness score", the "character recognition score", the "color-component score", and the "contour score" and thereafter calculating the mean value thereof.

The presentation-image determination section 160 of the embodiment of the present invention determines an image to be presented to the user in accordance with the total scores of the individual images, which are stored in the total-score storage section 155, obtains the determined image from the search-results storage section 120, and passes the image to the input/output section 105 to present to the user. In the embodiment of the present invention, an image having the highest total score of the images included in the search results is identified and presented to the user.

Figure 2:
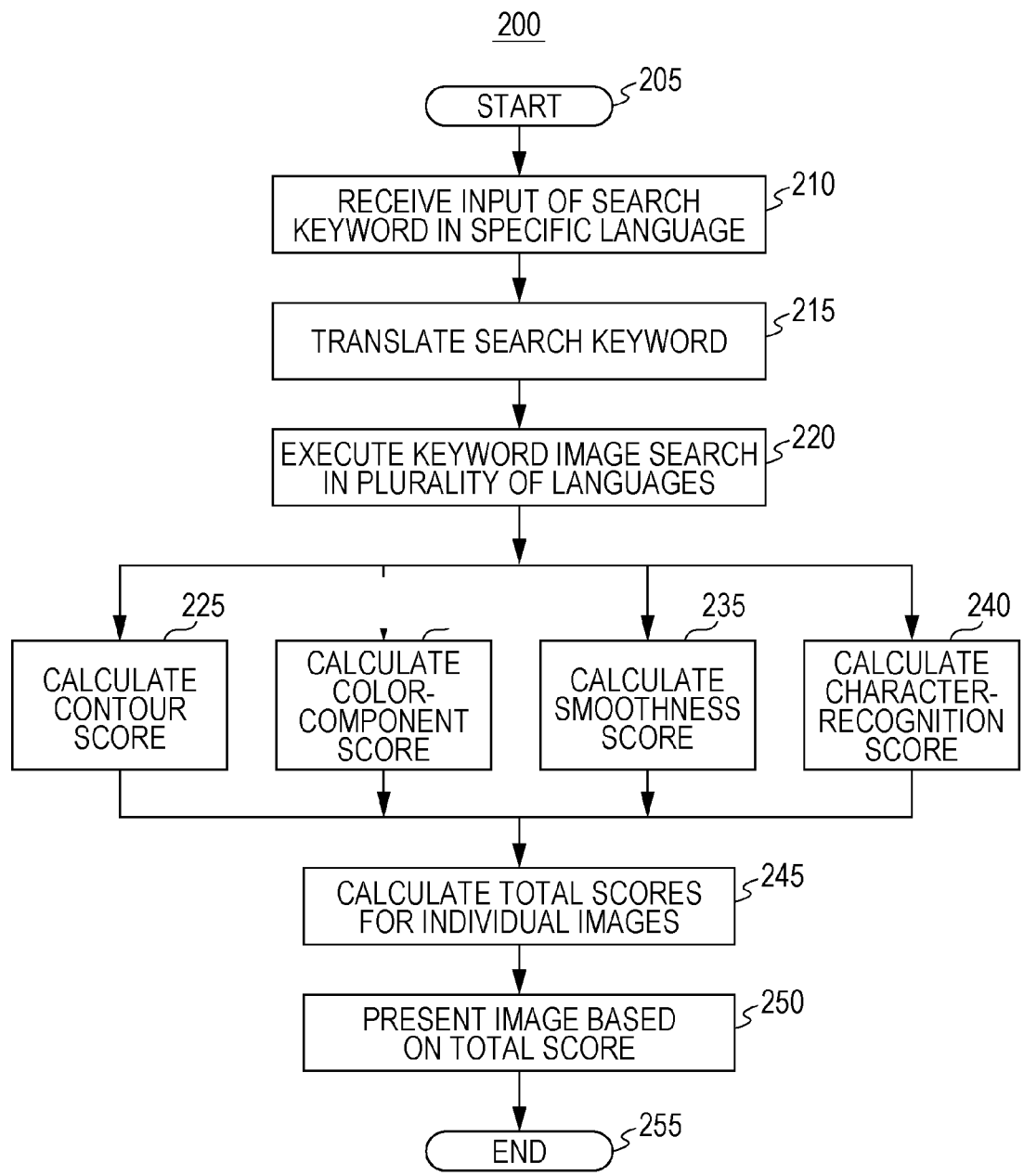
FIG. 2 is a flowchart showing the overall operation of the image search system of the embodiment of the present invention.

FIG. 2 is a flowchart 200 showing the overall operation of the image search system 100 of the embodiment of the present invention. The process starts at step 205, and in step 210, input of a search criterion, such as a keyword or a natural sentence, is received in a specific language from a user. If a natural sentence is input as a search criterion, in step 210, the image search system 100 performs keyword extraction using the tf-idf method described in connection with the keyword extraction section 110.

The process moves to step 215, in which the search keyword in the specific language, which is extracted in step 210, is translated into other predetermined languages. Preferably, the other languages include a language that a target audience uses in communication in a multilanguage environment and include one or more predetermined main languages. The other languages may be designated by the user. In the embodiment of the present invention, a set of keywords in four languages, that is, "English", "Japanese", "Chinese", and "Spanish" is finally obtained.

Next, in step 220, an image search is executed using a search keyword in the plurality of (four) languages. In the embodiment of the present invention, image search is performed by forming a query including a search keyword and a corresponding language attribute for each of the languages, images obtained as results thereof are each given the language attribute included in the query, and they are associated with each other. The results of the image search are stored in the search-results storage section 120.

In the embodiment of the present invention, in steps 225 to 240 after step 220, the processes for calculating "contour score", "color-component score", "smoothness score", and "character recognition score" are executed in parallel, respectively.

After the processes for calculating "contour score", "color-component score", "smoothness score", and "character recognition score" in steps 225 to 240 have been completed, the process moves to step 245. In step 245, total scores are calculated for the individual images of the search results based on the "smoothness score", "character recognition score", "contour score", and "color-component score". In the embodiment of the present invention, the total score is calculate by normalizing the "smoothness score", "character recognition score", "contour score", and "color-component score" and thereafter obtaining the simple mean value thereof.

Next, the process moves to step 250, in which an image to be presented is determined on the basis of the total score calculated in step 245, and the determined image is presented to the user. In the embodiment of the present invention, an image having the highest total score is presented to the user. The process moves to step 255, in which the process ends.

An example of the contour-score calculating process or the color-component-score calculating process across languages in the embodiment of the present invention will be described in more detail with reference to flowcharts in FIGS. 3 and 4. Note that the contour-score calculating process and the color-component-score calculating process correspond to step 225 and 230 in the flowchart 200 in FIG. 2, respectively.

Figure 3:
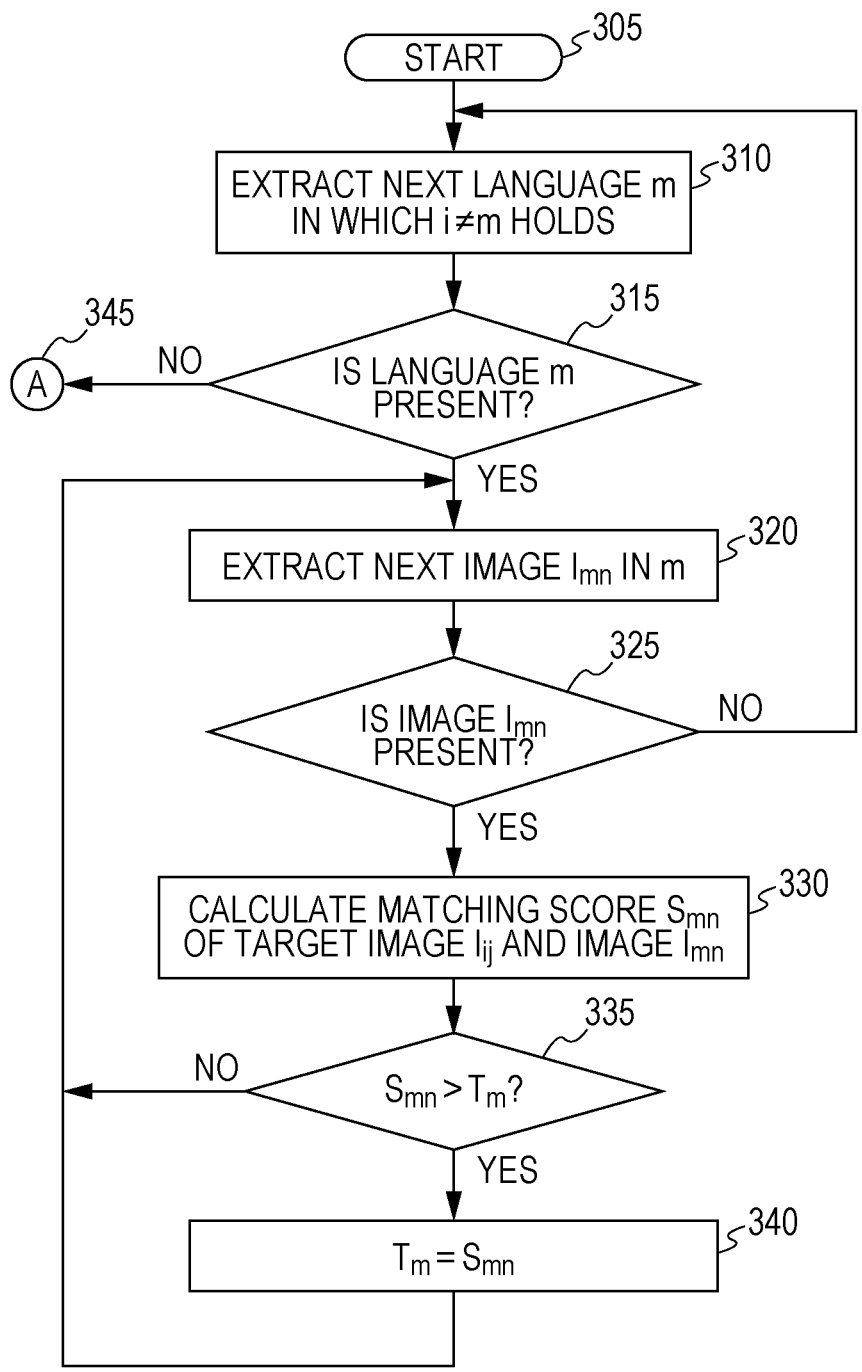
FIG. 3 is a flowchart showing the first half of the operation of a contour-score calculating process or a color-component-score calculating process across languages in the embodiment of the present invention.
Figure 4:
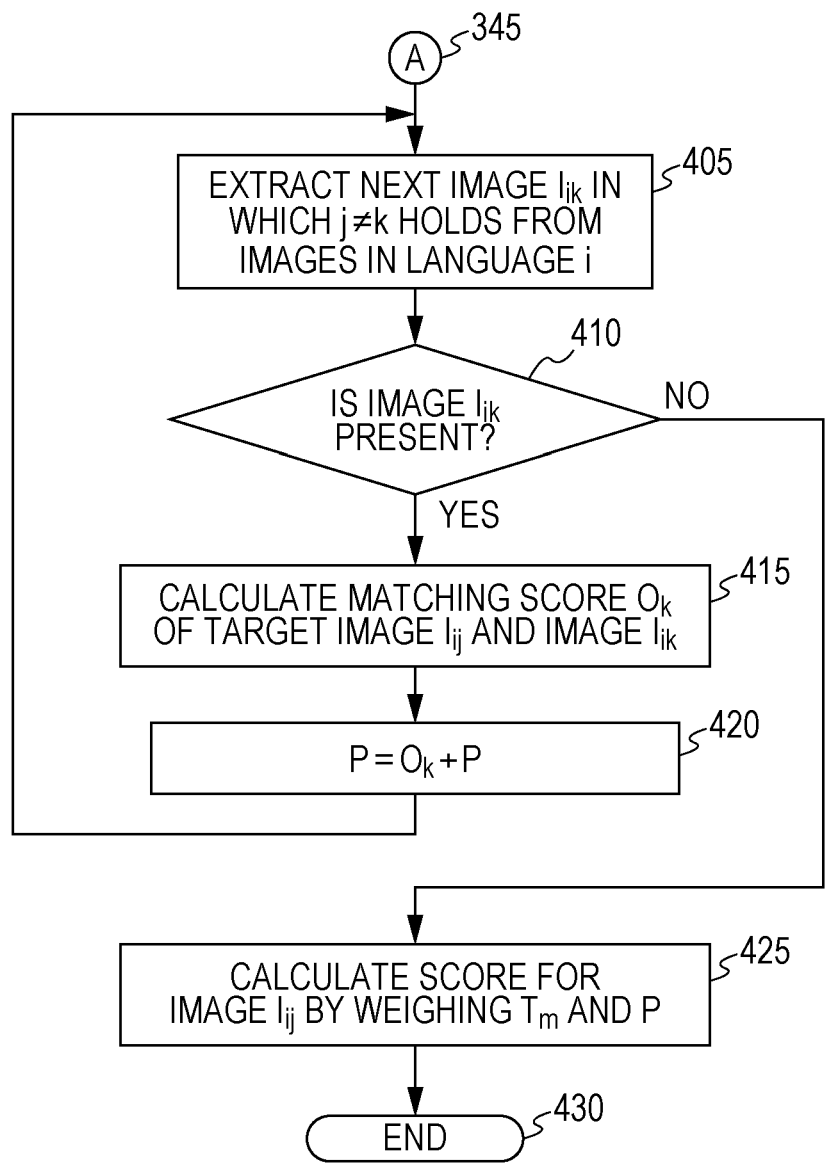
FIG. 4 is a flowchart showing the latter half of the operation of the contour-extraction or color-component matching process across languages in the embodiment of the present invention.

In the flowcharts shown in FIGS. 3 and 4, the contour-score calculating process or the color-component-score calculating process are performed for an image $I_{ij}$ to which a language i is given as a language attribute. In the embodiment of the present invention, the steps in FIGS. 3 and 4 are executed by the contour detection section 130 or the color detection section 135.

FIG. 3 is a flowchart showing the first half of the operation of the contour-score calculating process or the color-component-score calculating process across languages in the embodiment of the present invention. The process starts from step 305, and an attempt to identify a language m other than the target language i is made in step 310.

The process moves to step 315, in which it is determined whether the other unprocessed language m is present. If it is determined in step 315 that the other language m is present, the process moves to step 320 along the arrow of YES, in which an attempt to extract an image $I_{mn}$ to which the language attribute of the language m is given is made, and next in step 325, it is determined whether the image $I_{mn}$ is successfully extracted.

If it is determined in step 325 that the image $I_{mn}$ is successfully extracted, the process moves to step 330 along the arrow of YES, in which a matching score $S_{mn}$ of the target image $I_{ij}$ and the image $I_{mn}$ extracted in step 320 is calculated. Since the specific process of the contour matching or the color component matching will be described later in detail using flowcharts shown in FIGS. 5 and 6, it is not described here.

The process moves to step 335, in which it is determined whether the matching score $S_{mn}$ obtained in step 330 is larger than a maximum matching score $T_m$ obtained at previous matching between the target image $I_{ij}$ and the image $I_{mn}$ to which the language m is given as a language attribute. In the embodiment of the present invention, for the case where matching for the target image $I_{ij}$ is performed first, the maximum matching score $T_m$ is set to 0 as an initial value.

If it is determined in step 335 that the matching score $S_{mn}$ obtained in step 330 is larger than the maximum matching score $T_m$ obtained at previous matching, the process moves to step 340, in which the maximum matching score $T_m$ is replaced with the matching score $S_{mn}$ obtained in step 330, and thereafter, the process moves to step 320. If it is determined in step 335 that the matching score $S_{mn}$ obtained in step 330 is not larger than the maximum matching score $T_m$ obtained at previous matching, the process returns to step 320.

After the process returns to step 320, the above process from step 320 to step 340 is repeated until the image $I_{mn}$ is no longer present. During the repetition, if it is determined in step 325 that the image $I_{mn}$ is not present, the process comes out of the loop from the arrow NO and returns to step 310, from which the subsequent processes are repeated for another language. During the repletion of the process in step 310 and the subsequent processes, if it is determined in step 315 that any more unprocessed languages are not present, the process shifts to the flowchart in FIG. 4 via a mark A in step 345 along the arrow of NO.

FIG. 4 is a flowchart showing the latter half of the operation of the contour-extraction or color-component matching process across languages in the embodiment of the present invention. The process starts from the mark A in step 345, and in step 405, the next image $I_{ik}$ in which j≠k holds is extracted from the set of images to which the language i is given as a language attribute.

Next, it is determined in step 410 whether the image $I_{ik}$ is present. If it is determined in step 410 that the image $I_{ik}$ is present, the process moves to step 415, in which a matching score $O_k$ of the target image $I_{ij}$ and the image $I_{ik}$ extracted in step 405 is calculated. Since the details of the specific process of the contour matching or the color component matching will be described using flowcharts shown in FIGS. 5 and 6, they are not descried here.

The process moves to step 420, in which the value $O_k$ calculated in step 415 is added to a cumulative value P of the previous matching scores of the target image $I_{ij}$ and images to which the same language i is given as a language attribute. Thereafter, the process returns to step 405, from which the process is repeated until it is determined in step 410 that the image $I_{ik}$ is not present. If it is determined in step 410 that the image $I_{ik}$ is not present, the process moves to step 425.

In step 425, the color-component score or the contour score of the image $I_{ij}$ is calculated by weighing $T_m$ and P. The process moves to step 430, at which it ends.

Figure 5:
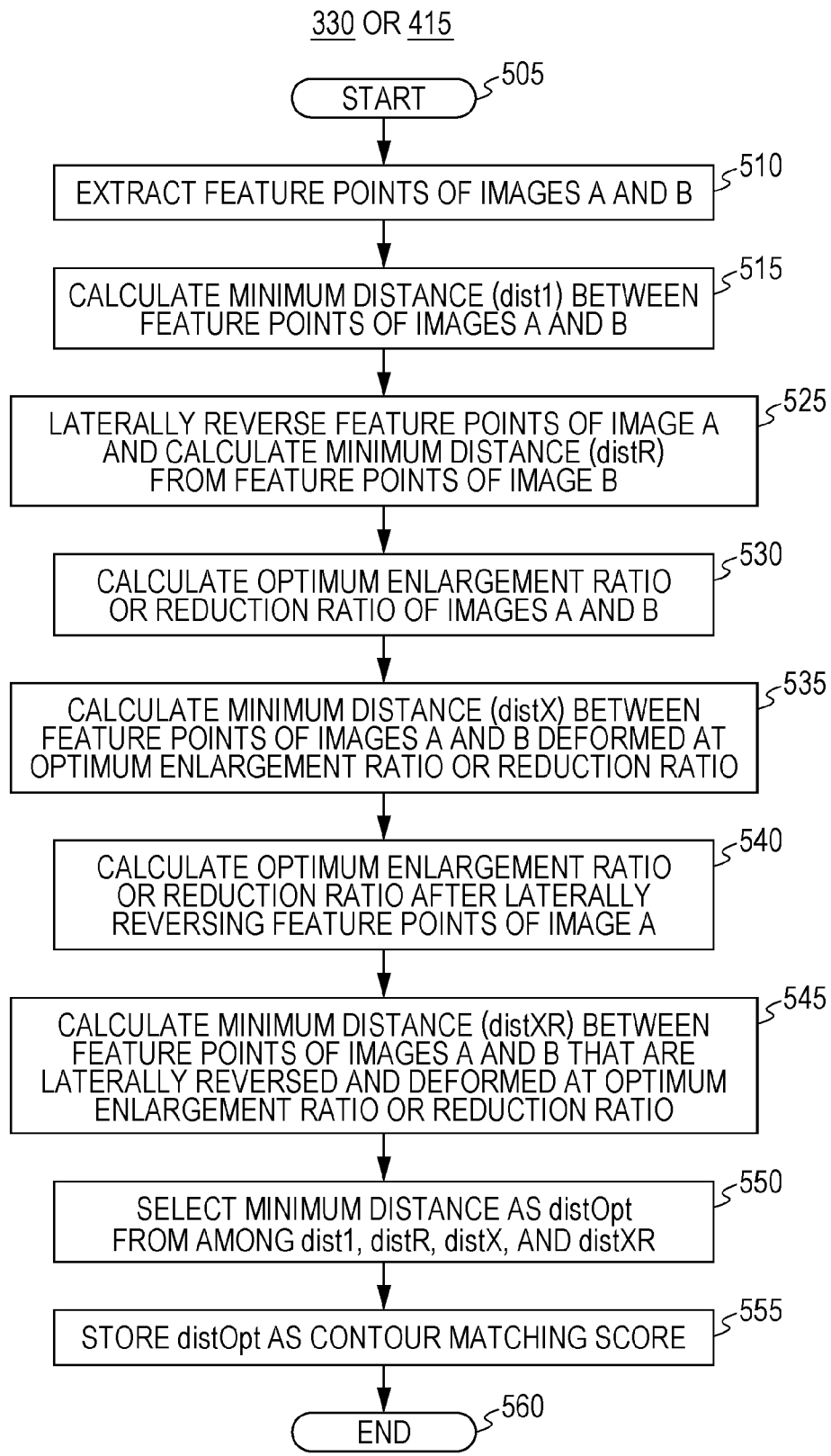
FIG. 5 is a flowchart showing still more details of the contour-score calculating process across languages in the embodiment of the present invention.

The process of calculating "contour score" in the embodiment of the present invention will be described in more detail using FIG. 5. FIG. 5 is a flowchart showing still more details of the contour-score calculating process across languages in the embodiment of the present invention. Note that the process of this flowchart corresponds to step 330 in the flowchart of FIG. 3 or step 415 in the flowchart of FIG. 4. The steps shown in FIG. 5 are executed by the contour detection section 130.

The process starts from step 505, and in step 510, feature points of two images (here, images A and B) are extracted. Here, the images A and B correspond to the images $I_{ij}$ and $I_{mn}$ in step 330 and correspond to the images $I_{ij}$ and $I_{ik}$ in step 415. The feature points of the images can be calculated in accordance with the known Gabor filter method, and specifically, can be obtained by the following expression.

$$g(x, y; \lambda, \theta, \psi, \sigma, \gamma) = \exp\left(-\frac{x'^2 + \gamma^2 y'^2}{2\sigma^2}\right) \cos\left(2\pi \frac{x'}{\lambda} + \psi\right)$$

where
x'=x cos θ+y sin θ
y'=−x sin θ+y cos θ
where λ is the cosine component of the wavelength, θ is the orientation of the striped pattern of a Gabor function, ψ is the phase offset, γ is the spatial aspect ratio, and σ is the size of the Gaussian envelope.

The process moves to step 515, in which the minimum distance dist1 between the feature points of the image A and the feature points of the image B extracted in step 510 is calculated. The minimum distance here is the sum total of the distances between the feature points of the image A and the feature points of the image B in the case where combinations of a feature point of the image A and a feature point of the image B are formed without exception so that the sum total becomes the minimum. Next, in step 525, the image A is laterally reversed, and the minimum distance distR between the feature points of the reversed image A and the feature points of the image B is calculated.

Next, the process moves to step 530, in which an optimum enlargement or reduction ratio for the images A or B is calculated. The optimum enlargement or reduction ratio is a ratio for enlarging or reducing one of the images A and B so that the images A and B have the same size (the same width and height if they have different aspect ratios). In step 535, the minimum distance distX between the feature points of the image A and the feature points of the image B enlarged or reduced using the enlargement ratio or the reduction ratio calculated in step 530 is calculated.

Next, in step 540, the image A is laterally reversed, and an optimum enlargement or reduction ratio for the laterally reversed image A and the image B is calculated. Next, in step 545, the minimum distance distXR between the feature points of the images A and B, which are enlarged or reduced using the enlargement or reduction ratio calculated in step 540, is calculated.

The process moves to step 550, in which the minimum value of the values dist1, distR, distX, and distXR is selected as distOpt. Note that the values distR, distX, and distXR are values in which, if a certain image is an image obtained merely by laterally reversing and/or enlarging or reducing the other image, they should be treated as similar images. Next, in step 555, the value distOpt is stored as a contour matching score, and the process ends at step 560.

Figure 6:
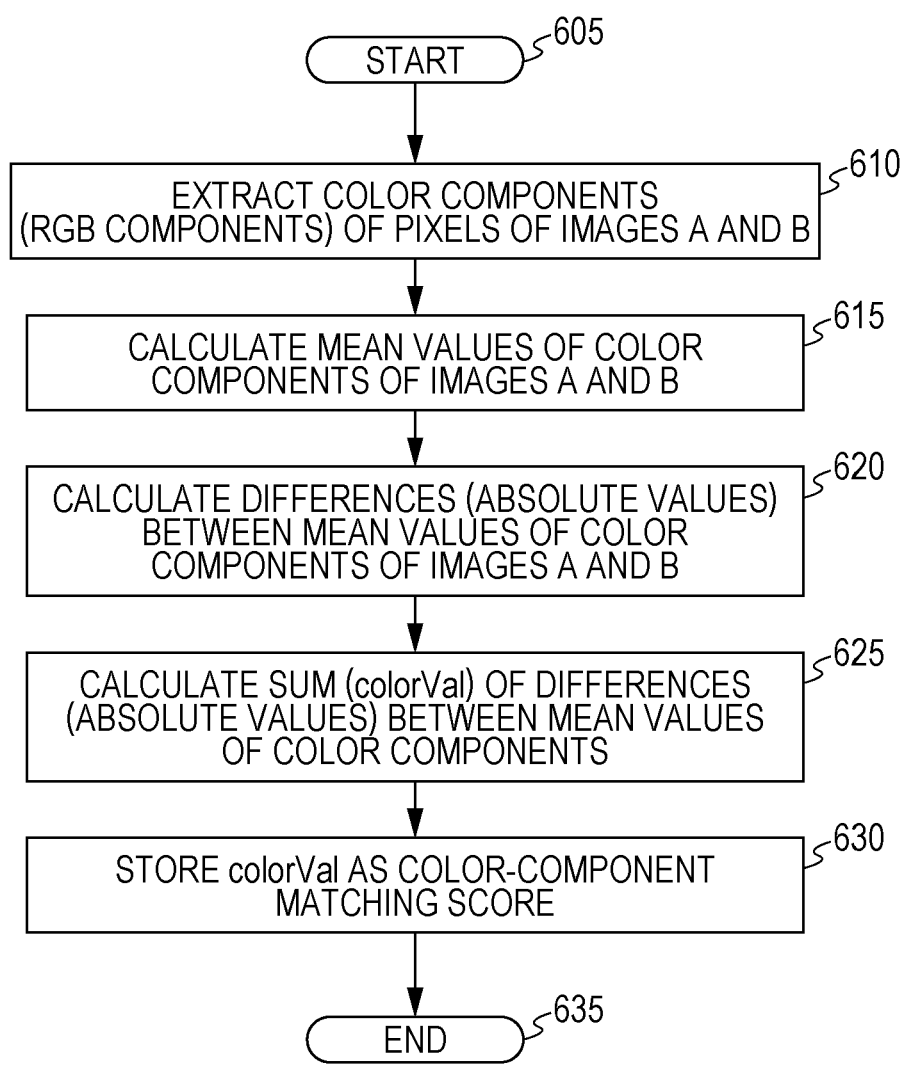
FIG. 6 is a flowchart showing still more details of the color-component-score calculating process across languages in the embodiment of the present invention.

The process of calculating "color-component score" in the embodiment of the present invention will be described in more detail using FIG. 6. FIG. 6 is a flowchart showing still more details of the color-component-score calculating process across languages in the embodiment of the present invention. Note that the process of this flowchart corresponds to step 330 in the flowchart of FIG. 3 or step 415 in the flowchart of FIG. 4. The steps shown in FIG. 6 are executed by the color detection section 135.

The process starts from step 605, and in step 610, predetermined color components, here, RGB components, are extracted for two images (images A and B). Here, the images A and B correspond to the images $I_{ij}$ and $I_{mn}$ in step 330 and correspond to the images $I_{ij}$ and $I_{ik}$ in step 415.

Next, in step 615, the mean values of the individual color components, that is, red (R), green (G), and blue (B), of the images A and B are calculated, and in step 620, the absolute values of the differences between the mean values of the individual color components calculated in step 615 are calculated. Next, in step 625, the sum (colorVal) of the differences between the mean values of the individual color components is calculated. Then, in step 630, the value colorVal is stored as a matching score concerning color components, and the process ends in step 635.

Figure 7:
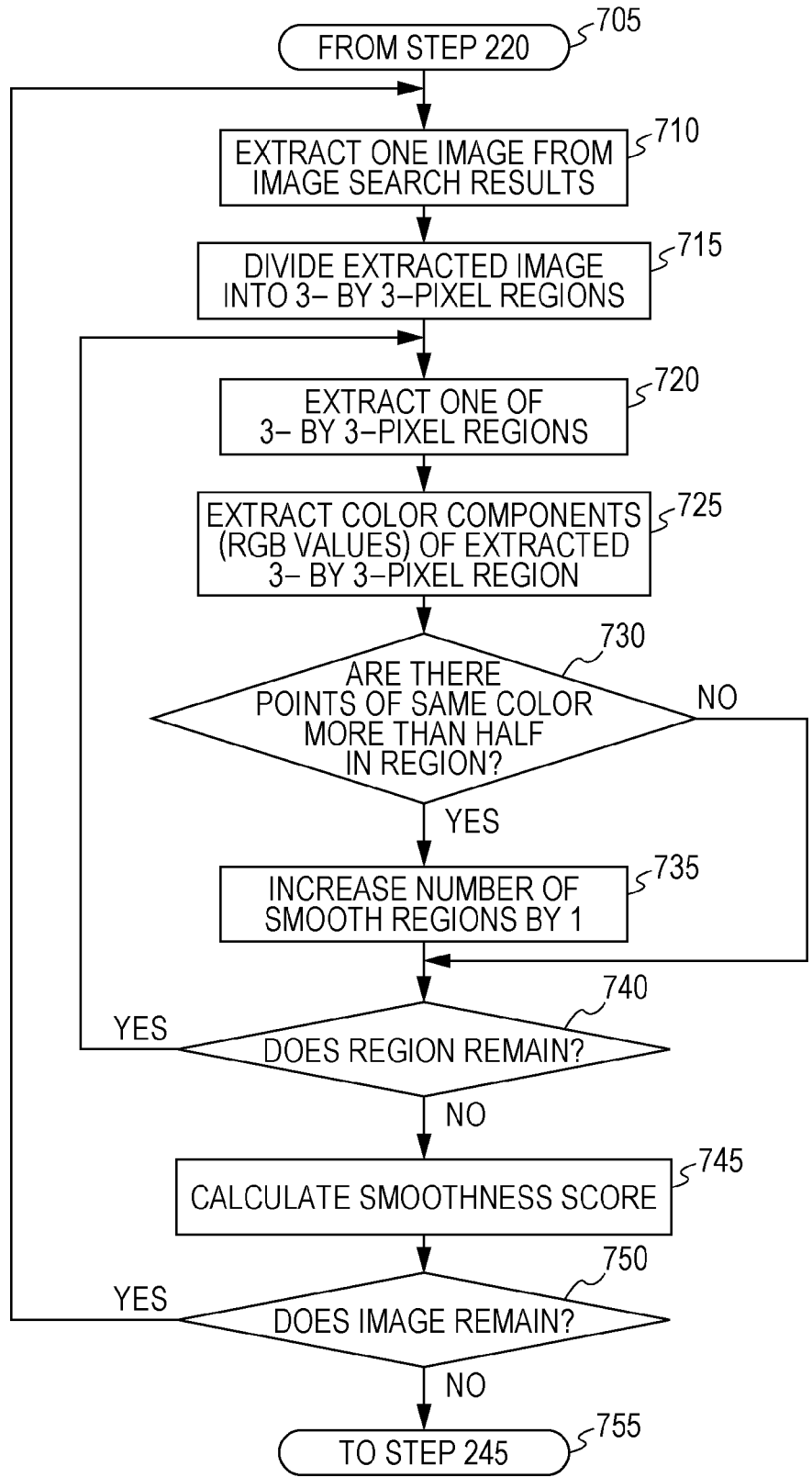
FIG. 7 is a flowchart showing the details of a smoothness-score calculating process across languages in the embodiment of the present invention.

Next, the process of calculating the "smoothness score" in the embodiment of the present invention will be described in detail using the flowchart shown in FIG. 7. Note that the process of the flowchart shown in FIG. 7 corresponds to step 235 in the flowchart 200 of FIG. 2. The steps in this flowchart are executed by the smoothness detection section 140.

First, the process starts from step 705 after execution of step 220, and in step 710, one image is extracted from images included in the results of image search in step 220. Next, in step 715, the image extracted in step 710 is divided into subregions (here, 3-by 3-pixel regions) in accordance with predetermined rules. The process moves to step 720, in which one of the regions divided in step 715 is extracted, and in step 725, the color components (here, RGB components) of the region extracted in step 720 are extracted.

The process further advances to step 730, in which it is determined whether the number of points of the same color present in the target region is larger than a predetermined percentage (here, 50%) on the basis of the color components extracted in step 725. If it is not determined in step 730 that the number is larger than the predetermined proportion, the process moves to step 740 along the arrow of NO. If it is determined in step 730 that the number is larger than the predetermined proportion, the process moves to step 735 along the arrow of YES. In step 735, "the number of smooth regions", which is a variable, is increased by one, and the process moves to step 740.

In step 740, it is determined whether the unprocessed region obtained by dividing in step 715 remains. If it is determined in step 740 that it remains, the process returns to step 720 along the arrow of YES, and the subsequent process is repeated. If it is determined in step 740 that no region remains, the process moves to step 745 along the arrow of NO, in which the smoothness score of the target image is calculated according to the following expression.

Smoothness score=number of smooth regions/total number of divided regions

After the smoothness score is calculated in step 745, the process moves to step 750, in which it is determined whether the unprocessed image remains in the images obtained by the image search in step 220. If it is determined in step 750 that there is a remaining unprocessed image, the process returns to step 710 along the arrow of YES, and the subsequent process is repeated. If it is determined in step 750 that no unprocessed image remains, the process moves to step 755 along the arrow of NO, in which the process ends (moves to step 245).

Next, the process of calculating "character recognition score" in the embodiment of the present invention will be described. As has already been described, the process of calculating "character recognition score" is executed by the character-recognition analysis section 145. Using the existing optical character recognition technique allows the probability of presence of a character in a region in which a character may be included in the image (referred to as a "character region") to be obtained by identify the character region and performing matching between an image present in the character region and character font data prepared in advance. In the embodiment of the present invention, the reciprocal of the probability of the presence of a character in the character region is calculated as "character recognition score".

As described above, the total-score calculation section 150 of the embodiment of the present invention obtains the total score by normalizing the "contour score", "color-component score", "smoothness score", and "character recognition score" and then calculating the mean value thereof. The individual scores can be normalized so they fall within predetermined ranges in accordance with predetermined rules. For example, the normalized contour score of the image i can be obtained by the following expression:

Normalized contour score of image $i$=(maximum value of contour scores of all images+$M1$)/(contour score of image $i$+$M1$)

where M1 is a constant other than 0 to prevent the above expression from division by zero.

For example, the normalized color-component score of the image i can be obtained by the following expression:

Normalized color-component score of image $i$=(maximum value of color-component scores of all images+$M2$)/(color-component score of image $i$+$M2$)

where M2 is a constant other than 0 to prevent the above expression from division by zero.

Referring to FIGS. 9 to 11, examples of search results of the image search system in the embodiment of the present invention will be described. Note that, although FIGS. 9 to 11 are expressed as monochrome screens because of the constraint that color drawings cannot be used in application drawings, images of actual examples are color icons. FIG. 9 is a diagram illustrating an example of search results of the image search system in the embodiment of the present invention. The example shown in FIG. 9 shows a case where an English word, "earthquake", is selected as an input keyword. Note that, in this case, corresponding translated keywords are Japanese "jishin", Chinese "dizhen", and Spanish "terremoto". In this example, since an image obtained as a fourth candidate when the search is performed using English "earthquake" has the highest total score (total score=0.88), this image is presented to the user.

FIG. 10 is a diagram for explaining another example of search results of the image search system in the embodiment of the present invention. The example shown in FIG. 10 shows a case where the English word "tsunami" is selected as an input keyword. Note that, in this case, corresponding translated keywords are Japanese "tsunami", Chinese "haixiao", and Spanish "tsunami". In this example, since an image obtained as a fourth candidate when the search is performed using English "tsunami" has the highest total score (total score=0.96), this image is presented to the user.

FIG. 11 is a diagram for explaining still another example of search results of the image search system in the embodiment of the present invention. The example shown in FIG. 11 shows that an English word "exit" is selected as an input keyword. Note that, in this case, corresponding translated keywords are Japanese "deguchi", Chinese "chukou", and Spanish "salida". In this case, since an image obtained as a fifth candidate when the search is performed using Japanese "deguchi" has the highest total score (total score=0.96), this image is presented to the user.

Figure 12:
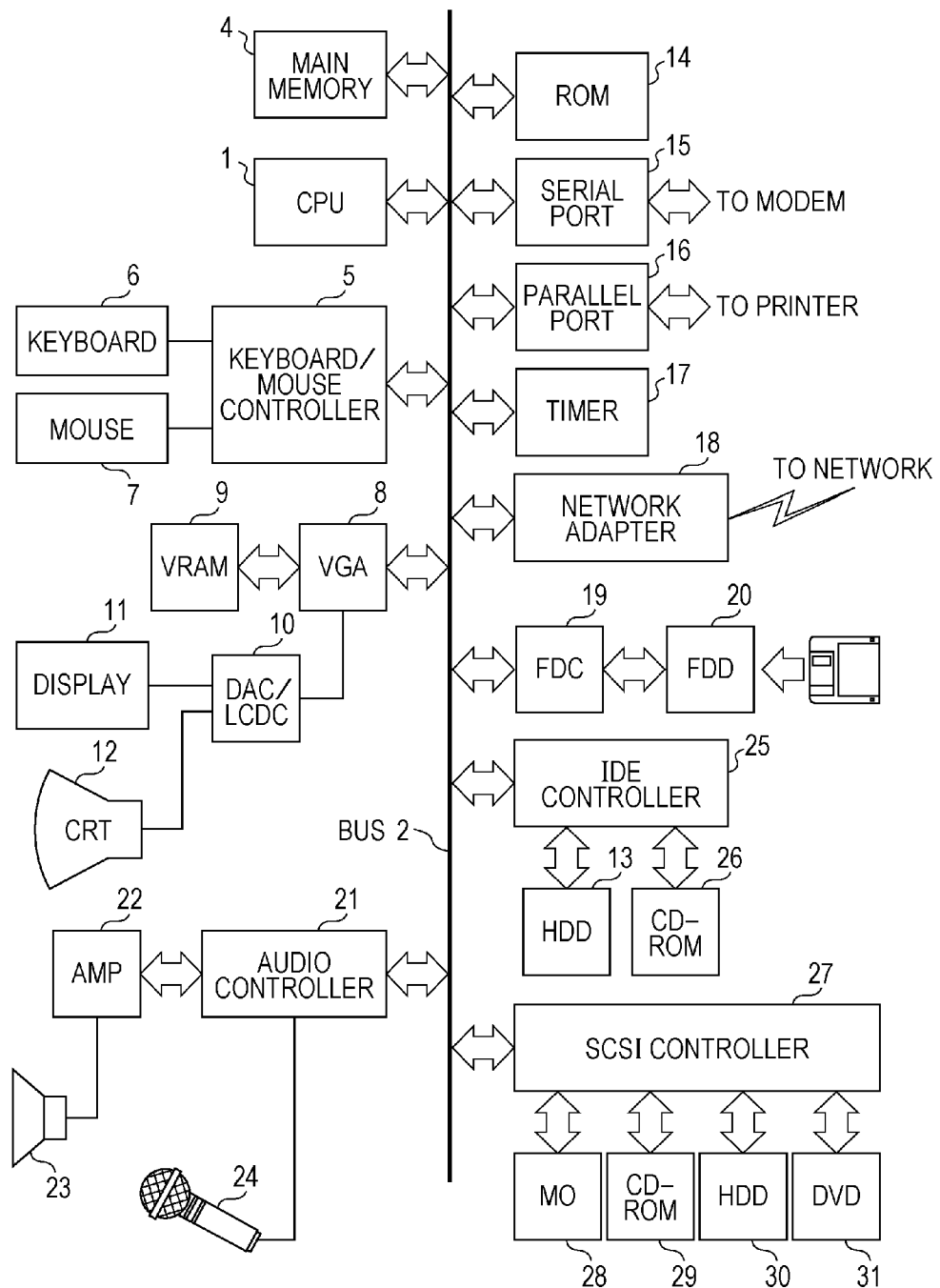
FIG. 12 is a diagram showing an example of the hardware configuration of an information processing unit suitable for implementing the image search system of the embodiment of the present invention.

FIG. 12 is a diagram showing an example of the hardware configuration of an information processing unit suitable for implementing the image search system of the embodiment of the present invention. The information processing unit includes a central processing unit (CPU) 1 and a main memory 4 connected to a bus 2. Removable storages (external storage systems in which storage media can be replaced), such as hard disk drives 13 and 30, CD-ROM drives 26 and 29, a flexible disk drive 20, an MO drive 28, and a DVD drive 31, are connected to the bus 2 via a floppy disk controller 19, an IDE controller 25, and an SCSI controller 27.

Storage media, such as a flexible disk, an MO, a CD-ROM, and a DVD-ROM, are inserted into the removable storages. Such storage media, the hard disk drives 13 and 30, and a ROM 14 can store computer program codes for giving instructions to the CPU and so on in cooperation with an operating system to implement the present invention. The computer programs are loaded in the main memory 4 so that they are executed. The computer programs can also be compressed or divided into a plurality of pieces and stored in a plurality of media.

The information processing unit receives input from input devices, such as a keyboard 6 and a mouse 7, via a keyboard/mouse controller 5. The information processing unit is connected to a display 11 for presenting visual data to users via a DAC/LCDC 10.

The information processing unit can be connected to a network via a network adapter 18 (Ethernet® or the like) to communicate with another computer and so on. Although not shown, the information processing unit can also be connected to a printer via a parallel port or to a modem via a serial port.

It will be easily understood with the above description that the information processing unit suitable for implementing the image search system according to the embodiment of the present invention can be implemented by an information processing unit, such as a common personal computer, a workstation, and a main frame, or a combination thereof. However, these components are merely examples, and all the components are not absolutely necessary components of the present invention.

It will also be obvious to those skilled in the art that various changes can be made in the hardware components of the information processing unit used in the embodiment of the present invention, such as combining a plurality of machines and distributing the functions thereto. These changes are of course included in the spirit of the present invention.

The image search system of the embodiment of the present invention adopts an operating system that supports a graphical user interface (GUI) multiwindow environment, such as the Windows® operating system presented by Microsoft Cooperation, Mac OS® presented by Apple Inc., and the UNIX® system (for example, AIX® presented by International Business Machines Cooperation).

Thus, it can be understood that the image search system used in the embodiment of the present invention is not limited to use in a specific operating system environment.

As can be understood by those skilled in the art, the present invention can be embodied as a system, a method, or a computer program product. Therefore, the present invention can adopt an embodiment as whole hardware, whole software (including firmware, resident software, and microcode) or an embodiment in which software, which is generally referred to as "circuit", "module", or "system", and hardware are combined. Furthermore, the present invention can also adopt the form of a computer program product embodied as a physical expression medium having computer-usable program code implemented by the medium.

The present invention can also use a combination of computer-usable/computer-readable media. Examples of the computer-usable/computer-readable media include electronic, magnetic, optical, electromagnetic, infrared, and semiconductor systems, units, devices, and propagation media, although not limited thereto. An inexhaustive list of more specific examples of the computer-readable media includes electrical connection having a lead, a portable computer diskette, a hard disk, a random access memory (RAM), a read-only memory (ROM), an erasable programmable read-only memory (EPROM or a flash memory), an optical fiber, a portable compact disk read-only memory (CD-ROM), an optical storage device, a transmission medium that supports the Internet or an intranet, and a magnetic storage device.

It should be noted that since programs are electronically obtained by optically scanning, for example, paper or another medium, and are compiled, interpreted, processed by an appropriate method as necessary, and stored in a computer memory, the computer-usable/computer-readable media may be paper on which the program is printed or other appropriate media. The computer-usable/computer-readable media may be any media capable of including, storing, communicating, propagating, or carrying a program used by an instruction execution system, unit, or device or in relation thereto. The computer-usable media can include a propagated data signal including a program code that a computer implemented together therewith can use in a base band or as part of carrier waves. The computer-usable program code can be transmitted using an appropriate medium including radio, a wire line, an optical fiber cable, and RF, but not limited thereto.

A computer program code for implementing the present invention can be described using one or a combination of a plurality of program languages including object-oriented programming languages, such as Java, Smalltalk, and C++, and conventional procedural programming languages, such as a C programming language and a similar programming language. The program code can be wholly or partly executed on a user's computer, or as a standalone software package, partly on a user's computer and partly on a remote computer, or wholly on a remote computer or a server. With the latter scenario, the remote computer can be connected to the user's computer via any kind of network including a local area network (LAN) or a wide area network (WAN), or to an external computer (for example, via the Internet using an Internet service provider).

The embodiment of the present invention has been described above with reference to the flowcharts of the method and/or block diagrams of the system and computer program product. It will be understood that the flowcharts and/or blocks in the block diagrams and combinations of the flowcharts/or blocks in the block diagrams can be executed according to instructions of the computer program. It is also possible that computer program instructions executed via a processor of a general-purpose computer, a special-purpose computer, or another programmable data processing unit are given to the processor of the computer or the other programmable data processing unit so as to manufacture a machine that generates means for executing a function/operation designated by flowcharts and/or one or a plurality of blocks.

These computer program instructions can also be stored in a computer-readable medium that can operate a computer or another programmable data processing unit in a specific form so as to manufacture a product including means for executing a function/operation designated by flowcharts and/or one or a plurality of blocks.

These computer program instructions can also be loaded in a computer or another programmable data processing unit to produce a process to be executed by the computer so as to provide a process for executing a function/operation designated by flowcharts and/or one or a plurality of blocks and so as to execute a series of operation steps on the computer or the other programmable data processing unit.

The flowcharts and the block diagrams in the drawings show the architecture, functionality, and executing operations of the system, method, and computer program products according to various embodiments of the present invention. In this respect, the flowcharts or the individual blocks of the block diagrams can show modules, segments, or codes including one or a plurality of executable instructions for implementing designated logical functions. It should also be noted that, in an alternative implementation example, functions indicated in the blocks are sometimes executed in a different sequence from those shown in the drawings. For example, two blocks shown in sequence are sometimes actually executed substantially at the same time or in reverse order. The blocks in the block diagrams and/or the flowcharts and combinations of the blocks in the block diagrams and/or the flowcharts can be executed by a system mainly composed of hardware for special purpose for performing a special function or action or a combination of special purpose hardware.

It is obvious to those skilled in the art that the above embodiment can be variously changed or modified. For example, although the embodiment of the present invention has been described on condition that a single image is presented to the user, a plurality of images having high total scores can be presented on the basis of total scores. Furthermore, in the embodiment of the present invention, although the total score is obtained by normalizing "contour score", "color-component score", "smoothness score", and "character recognition score" and then calculating the mean value thereof, those skilled in the art can obtain the total score from "contour score", "color-component score", "smoothness score", and "character recognition score" by various methods.

Furthermore, in calculation of "contour score", it is possible that a shape-pattern classification dictionary is prepared in advance, a related shape pattern classification is identified with reference to the dictionary, and thereafter a similarity among a plurality of non-text elements is calculated in consideration of the identified pattern classification. Furthermore, in calculation of "color-component score", the mean value of the color component values of the image is obtained; instead, it is possible to use not only the median, mode, and/or a significant value of color components of the image but also representative values of all color components as appropriate. Furthermore, in calculation of "character recognition score", the character recognition score can be set low when a larger number of characters are included in the image element.

Although the present invention has been described using a still image as an example of non-text information, moving images, sound, etc. can be compiled into a database by indexing so as to be searched for, and any non-text information whose mutual similarity can be calculated and a combination thereof can also be searched for. For example, for sound, an existing sound recognition technique can be used instead of the optical character recognition technique. Of course, the above changes and modifications can also be included in the technical scope of the present invention.

It should be understood that versatile non-text information suitable for use in a multilanguage environment can be effectively obtained by the embodiment of the present invention.

What is claimed is:

1. A computer implemented method for identifying a non-text element suitable for communication in a multilanguage environment by using a database in which a non-text element can be searched for, the method comprising the steps of:

receiving search results of the database using a first search criterion in a certain language and a second search criterion in another language corresponding to the first search criterion, wherein specific language attributes are associated with non-text elements that are included in the search results;

scoring the non-text elements included in the search results depending on a similarity to another element with which a different language attribute is associated, wherein at least one non-text element of the non-text elements is an image, and wherein scoring the at least one non-text element further comprises:

attempting character recognition of a character included in the image by using an optical character recognition technique;

calculating character recognition scores for each character included in the image based on the result of the attempted character recognition, wherein the character recognition score is low if the image includes multiple characters; and identifying at least one of the non-text elements included in the search results on the basis of the scores.

2. The method according to claim 1, wherein, in the scoring step, a non-text element having a high similarity to another element with which a different language attribute is associated is given a high score.

3. The method according to claim 1, further comprising the step of translating the first search criterion in the certain language by using a translation engine to generate the second search criterion in the other language.

4. The method according to claim 1, further comprising the steps of:

searching the database by using the first search criterion in the certain language and the second search criterion in the other language corresponding to the first search criterion; and associating the language used for the search, as a language attribute, with the non-text elements included in the search results.

5. The method according to claim 1, wherein the scoring step includes the step of calculating shape scores for information about shapes included in the image elements by comparing the plurality of non-text elements.

6. The method according to claim 5, wherein the step of giving shape scores includes the step of extracting contour information of the image elements and the step of comparing the contour information extracted from the plurality of image elements.

7. The method according to claim 6, wherein, in the step of comparing the contour information, contour information that is larger, smaller, and/or different in orientation is compared.

8. The method according to claim 6, wherein the step of comparing the contour information includes the step of referring to a shape-pattern classification dictionary prepared in advance, in which a plurality of non-text elements are compared in consideration of a related shape-pattern classification.

9. The method according to claim 1, wherein the scoring step includes the step of calculating color-component scores for information about color components included in the image elements by comparing the plurality of non-text elements.

10. The method according to claim 9, wherein the step of calculating the color-component scores includes the step of comparing the representative color component values of the entire image for the plurality of image elements.

11. The method according to claim 10, wherein the representative value of the color components is the mean, median, mode and/or a significant value of the color component values of the image element in question.

12. The method according to claim 1, further comprising the step of calculating smoothness scores on the basis of the smoothness of the image elements.

13. The method according to claim 12, wherein the step of calculating the smoothness scores includes the step of dividing each of the image elements into a plurality of regions in accordance with predetermined rules, the step of calculating the proportion of the same color for each of the plurality of regions, and the step of calculating the smoothness scores on the basis of the proportion of the same color of each of the plurality of regions.

14. The method according to claim 1, wherein:

the step of scoring the non-text elements includes the step of calculating a total score on the basis of at least one of a shape score, a color-component score, a smoothness score, and a character recognition score of each of the non-text elements; and the identifying step includes the step of identifying at least one of non-text elements included in the search results on the basis of the total score.

15. A computer system for identifying a non-text element suitable for communication in a multi-language environment by using a database in which a non-text element can be searched, the system including a memory, a processor communicatively coupled to the memory, and a module configured to carry out the steps of:

receiving search results of the database using a first search criterion in a certain language and a second search criterion in another language corresponding to the first search criterion, wherein specific language attributes are associated with non-text elements that are included in the search results;

scoring the non-text elements included in the search results depending on a similarity to another element with which a different language attribute is associated, wherein at least one non-text element of the non-text elements is an image, and wherein scoring the at least one non-text element further comprises:

attempting character recognition of a character included in the image by using an optical character recognition technique;

calculating character recognition scores for each character included in the image based on the result of the attempted character recognition, wherein the character recognition score is low if the image includes multiple characters; and identifying at least one of the non-text elements included in the search results on the basis of the scores.

16. A non-transitory computer readable article of manufacture tangibly embodying computer readable instructions which, when executed, cause a computer to carry out the steps of a method comprising:

receiving search results of the database using a first search criterion in a certain language and a second search criterion in another language corresponding to the first search criterion, wherein specific language attributes are associated with non-text elements that are included in the search results;

scoring the non-text elements included in the search results depending on a similarity to another element with which a different language attribute is associated, wherein at least one non-text element of the non-text elements is an image, and wherein scoring the at least one non-text element further comprises:

attempting character recognition of a character included in the image by using an optical character recognition technique;

calculating character recognition scores for each character included in the image based on the result of the attempted character recognition, wherein the character recognition score is low if the image includes multiple characters; and identifying at least one of the non-text elements included in the search results on the basis of the scores.

* * * * *